United States Patent [19]

Harvey, II et al.

[11] 3,975,188

[45] Aug. 17, 1976

[54] ARC HEATER REDUCTION OF ZINC ROAST

[75] Inventors: Francis J. Harvey, II, Murrysville; Maurice G. Fey, Pittsburgh, both of Pa.

[73] Assignee: Westinghouse Electric Corporation, Pittsburgh, Pa.

[22] Filed: Aug. 11, 1975

[21] Appl. No.: 603,577

[52] U.S. Cl. .................................. 75/14; 75/88
[51] Int. Cl.² ................................... C22D 7/06
[58] Field of Search .................. 75/14, 88, 10 R

[56] References Cited
UNITED STATES PATENTS 2,637,649   5/1953   Handwerk et al. ............... 75/14

3,765,870   10/1973   Fey et al. ............... 75/10 R

*Primary Examiner*—M. J. Andrews
*Attorney, Agent, or Firm*—L. P. Johns

[57] ABSTRACT

A process for the reduction of zinc roast in which pulverized particles of zinc roast are fed into an arc heated jet of carbon monoxide, whereby the particles are heated and reduced from zinc oxide to zinc vapor which in turn is quenched with pulverized carbon in an endothermic reaction to yield additional carbon monoxide, after which the vaporized zinc is cooled to room temperature.

5 Claims, 1 Drawing Figure

U.S. Patent   Aug. 17, 1976   3,975,188
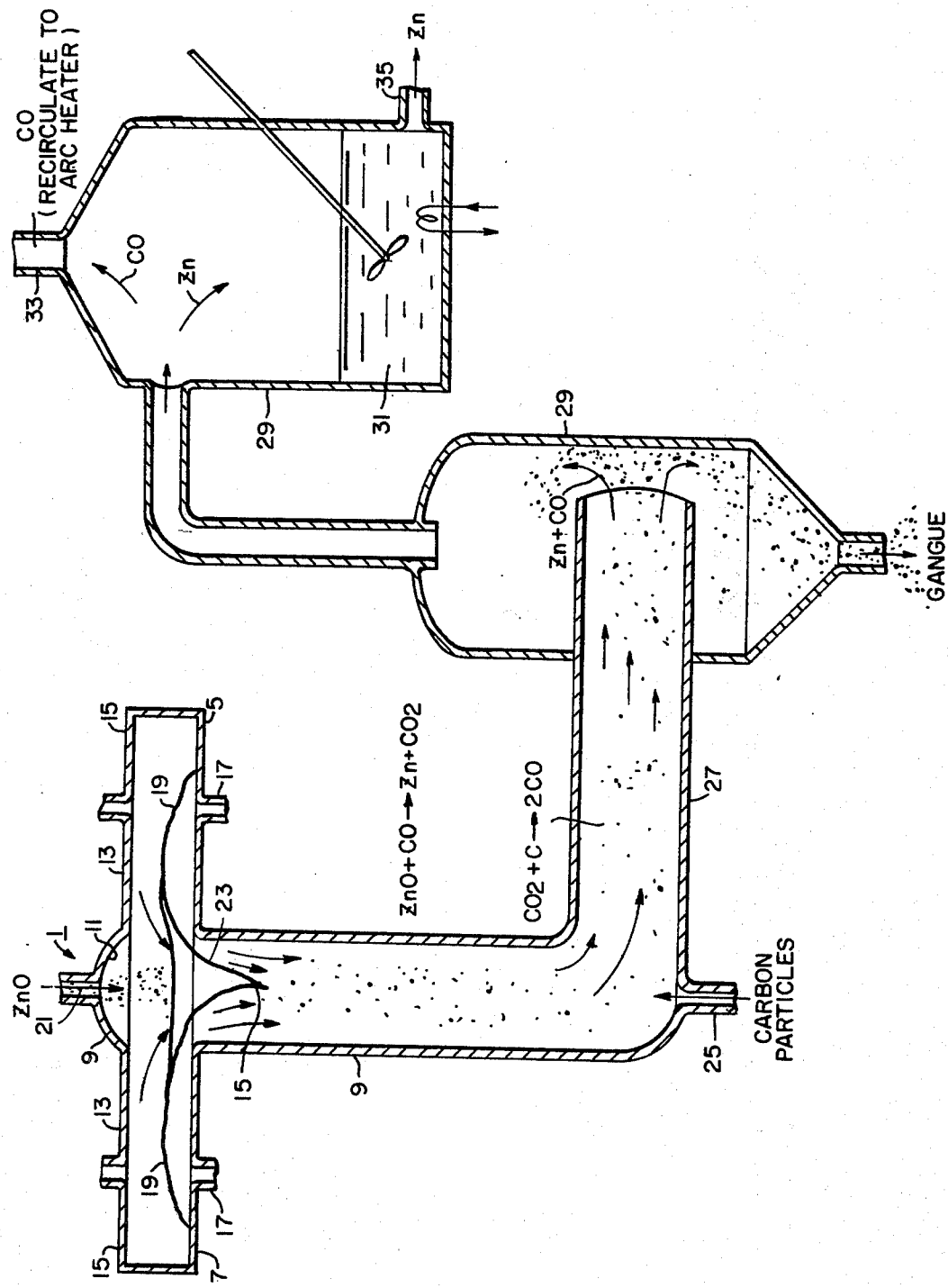

ARC HEATER REDUCTION OF ZINC ROAST

BACKGROUND OF THE INVENTION

1. Field of the Invention

This invention relates to a process for the reduction of zinc oxide to elemental zinc in a more economical manner.

2. Description of the Prior Art

Most zinc ores are sulfides (ZnS) that are first converted to oxides (ZnO) by roasting the sulfide in hot air. The resulting oxide is normally referred to as zinc roast. Various processes have been used for reducing zinc roast including a horizontal retort process, a continuous vertical process, an electro-thermic smelting process, and a blast furnace process. The horizontal retort process is a batch method requiring from 24 to 48 hours per batch. The continuous vertical process requires special preparation of the feed material in which zinc roast, carbon, and binder are pressed into briquets which are then dried and heated to coking temperatures. This process also requires external heating for which reason the rate of reduction is limited by heat transfer. The electro-thermic smelting process requires careful preparation of the feed material. Finally, the zinc blast furnace process requires shock cooling of the exit gas by passing it through an intense rain of molten lead, involving about 400 tons of lead per ton of zinc.

Another method for the extraction of zinc, such as disclosed in U.S. Pat. No. 3,271,134, involves the reduction of zinc oxide with finely divided carbonaceous material such as pulverized coke breeze or anthracite dust in a stream of oxygen containing gas. Among other things this process involves the danger of igniting the carbonaceous material and thereby overcoming the primary object of reducing zinc oxide.

SUMMARY OF THE INVENTION

It has been found in accordance with this invention that the foregoing difficulties may be overcome by providing a process for the reduction of zinc oxide comprising the steps of introducing powdered zinc roast into an arc heated gas stream consisting of an atmosphere of carbon monoxide to yield a mixture of elemental gaseous zinc and carbon dioxide, injecting solid carbon particles into the mixture to quench the temperature of the mixture by forming additional carbon monoxide, whereby a back reaction of zinc vapor to zinc oxide is avoided, and cooling the mixture to cause condensation of the zinc therefrom.

The advantage of the process of this invention is that no special preparation of the feed material is necessary, no external heating of the zinc oxide is required, the batch procedures of the prior methods are substituted with a continuous production method, and no shock cooling of exit gases is necessary. Moreover, the plasma arc heater process overcomes the inefficient prior method of external heating in which the rate of reduction is limited by heat transfer through a containing wall.

BRIEF DESCRIPTION OF THE DRAWING

The single view of the drawing is a diagrammatic vertical sectional view through apparatus for the reduction of zinc roast by arc heated carbon monoxide.

DESCRIPTION OF THE PREFERRED EMBODIMENT

As shown in the drawing, zinc roast is reduced in a three-arc heater system generally indicated at 1, one arc heater for each of the three phases of the A.C. power supply. Two arc heaters 5 and 7 are shown in the drawing. The arc heaters 5 and 7 are similar in construction and operation to that disclosed in U.S. Pat. No. 3,705,975, entitled "Self-Stabilizing Arc Heater" of which the inventors are Charles B. Wolf and Maurice G. Fey. Because of the full disclosure in that patent the description of the arc heaters 5 and 7 are limited herein to the basic structure and operation. The arc heaters 5 and 7 are self-stabilizing devices and may be operated on D.C. or line-frequency A.C. power. They are capable of power levels up to about 3500 kilowatts, or 10,000 kilowatts, or a three-phase plant installation.

For the practice of this invention, the arc heater system 1 comprises a central cylindrical housing 9 forming a plenum chamber 11. The three arc heaters, including arc heaters 5 and 7 shown in the drawing, extend radially from the housing 9 in a manner similar to that disclosed in the application of Maurice G. Fey, Ser. No. 603,579, filed Aug. 11, 1975. Because of the full disclosure in the above U.S. Pat. No. 3,705,975, the description of the three-phase arc heaters system is limited herein to the basic structure and operation. Briefly, each arc heaters 5 and 7 comprise two annular copper electrodes 13, 15 having a space or gap 17 of about 1 millimeter to accommodate a line frequency power source of about 4 kV. A spark occurs in the gap 17 and incoming feed stock gas in the gap 17 immediately blows the spark from the gap into the interior of the arc chamber formed by the aligned electrodes 13, 15. As a result, an extended arc 19 is formed between the upstream electrodes of the arc heaters. In this invention, the incoming stock gas is preferably carbon monoxide (CO).

As shown in the drawing, the arc 19 extends into the plenum chamber 11 and merges with corresponding arc 19 of the other arc heaters, whereby a downstream extremity of each arc 19 eventually skips over the downstream electrodes 13 to complete the circuit through one of the other arcs 19. Thus, a unique three-phase arc heater system is provided in which three-wye-connected self-stabilizing arc heaters fire into the common plenum chamber 11 where the arcs impinge on one another to form a three-phase arc which is drawn between upstream electrodes 15.

As shown in the drawing an inlet 21 is provided at the upper end of the housing 9 for introducing zinc roast. Zinc roast, resulting from oxidation of zinc sulfide ores, contains zinc oxide and gangue which is a residue of other minerals that are dependent upon the composition of the original ore. The zinc oxide is crushed and pulverized to a powder form having a size of approximately 100 microns to facilitate its being blown into the arc heated stream 23. Within the housing the reactants are subjected to a temperature ranging from about 25°C to about 1600°C, and preferably 1425°C, in accordance with the following equation:

$$ZnO(S) + CO(g) \rightarrow Zn(g) + CO_2(g) \tag{1}$$

The foregoing reaction occurs in the housing 9 with the zinc oxide fed into the arc heated stream 23 of carbon monoxide where the reactants commingle. The arc heated CO heats the zinc oxide concentrate and reduces the zinc oxide.

As the gas mixture falls through the housing 9, it is subjected to a carbon quench consisting of finely divided carbon that is injected into the gas stream at an inlet 25 located at the lower end of the housing. The carbon quench serves a dual purpose. First, the exit gas stream is cooled because of the endothermic nature of the reaction which is indicated by the following equation:

$$CO_2 + C \rightarrow 2CO \qquad (2)$$

Thus, the subsequent condensation step is more efficient. Second, carbon dioxide is removed from the gas stream which prevents back reaction of the zinc vapor to ZnO. During the quench the temperature of the gas stream is reduced from about 1700°K to about 1100°K; i.e. just above the boiling point of zinc.

As the gas stream continues to fall, it passes through a horizontal portion 27 of the housing from where it is directed into a cyclone particle separator 29 where the gangue is separated from the mixture of zinc and carbon monoxide. The latter (zinc and carbon monoxide) enters a condenser 29 where the temperature drops below the boiling point of zinc to enable the zinc vapor to condense out and collects in a liquid pool 31 of zinc at the bottom of the condenser. The condenser 29 is a standard splash condenser. Exhaust gases (CO, $CO_2$) pass from the condenser 29 via an exhaust port 33. Liquid zinc may be drained from the condenser 29 via an outlet 35. A heating coil 37 and a mixer 39 may be provided to maintain the zinc in a liquid status.

The following is an example of the process of this invention:

EXAMPLE

Elemental zinc is produced in accordance with the equation (1). The standard free energy change for this reaction is + 6000 cal/mole of Zn at 1700°K. The equilibrium yield of this reaction is 0.38 moles of Zn(g) produced per mol of CO. On this basis the overall reduction reaction is:

$$ZnO(s) + 2.63 CO \rightarrow Zn(g) + CO_2(g) + 1.63 CO \qquad (3)$$

The exit gas contains 27.5 percent Zn(g), 27.5 percent $CO_2$, and 45 percent CO.

The heat of formation from reaction (3) at 298°K is + 15,600 cal/mole of Zn(g). The heat required to raise the reaction products to 1700°K is + 73,590 cal/mole of Zn(g). Thus, the overall energy requirements are 89,190 cal/mole Zn(g), or 2458 BTU/lb Zn or 2180 BTU/lb CO. For a 100 ton/day plant with an overall energy efficiency of 0.6, the energy required is 10,000 KW or 1.20 KW-HR/lb Zn. The carbon monoxide required is 1.13 lb/lb of zinc (or $2.26 \times 10^{+5}$ lb for a 100 ton/day plant.

The zinc vapor (27.5%) in the exit gas stream 15 condenses at about 1100°K on the basis of its equilibrium vapor pressure. Thus, the exit gas can be theoretically cooled to 110°K without condensation occurring. The carbon quench reaction is represented by the equation (on the basis of 1 mole of $CO_2$):

$$CO_2 + xC \rightarrow 2x\ CO + (1-x)\ CO_2 \qquad (4)$$

where x = moles of carbon added.

The amount of carbon required to reduce the temperature of the exit gas stream, i.e. 1 mole $CO_2$, 1 mole Zn(g) and 1.63 CO, from 1700°K to 1100°K is 0.43 moles. This mass requirement is 0.079 lbs C/lb of zinc. After the carbon quench the gas stream will contain 24.6% Zn(g), 61.3% CO, and 14.1% $CO_2$. However, complete removal of $CO_2$ is preferable since part of the condenser exit gas stream essentially pure CO can be recirculated back to the arc heater in this case thus, theoretically eliminating a carbon monoxide requirement for the process. The addition of 0.57 moles of C per mole of Zn(g) (0.105 lb of C/lb of Zn) will theoretically eliminate the $CO_2$.

The principal advantages of the proposed process are (1) rapid heat transfer and reduction kinetics to reduce the long residence time required in the vertical and horizontal retort furnaces, (2) elimination of special preparation of feed material as required in the vertical retort and electrothermic smelter, and (3) elimination of elaborate condensation techniques as required in the zinc blast furnace process.

What is claimed is:

1. A process for the production of zinc comprising the steps of:
   a. injecting powdered zinc roast into an arc heated gas stream consisting of an atmosphere of carbon monoxide to yield a downstream mixture of elemental vaporous zinc, carbon monoxide, carbon dioxide, and gangue,
   b. injecting solid carbon particles into the downstream mixture to effect cooling of the mixture to a temperature slightly above the boiling point of zinc by an endothermic reaction of carbon dioxide and carbon to yield carbon monoxide and to prevent a back reaction of elemental zinc to zinc oxide, and
   c. cooling the mixture to effect condensation of elemental zinc.

2. The process of claim 1 in which at least step (a) is performed in the absence of oxygen and hydrogen.

3. The process of claim 1 in which step (a) is performed at a temperature of about 1700°K.

4. The process of claim 1 in which after step (c) the mixture of elemental zinc, carbon monoxide, and gangue is separated into separate components.

5. The process of claim 1 in which in step (b) the mixture is cooled to 1100°K.

* * * * *